July 29, 1958 C. E. HOADLEY 2,845,101
TIMBER SHEARING HEAD
Filed Aug. 31, 1955 3 Sheets-Sheet 1
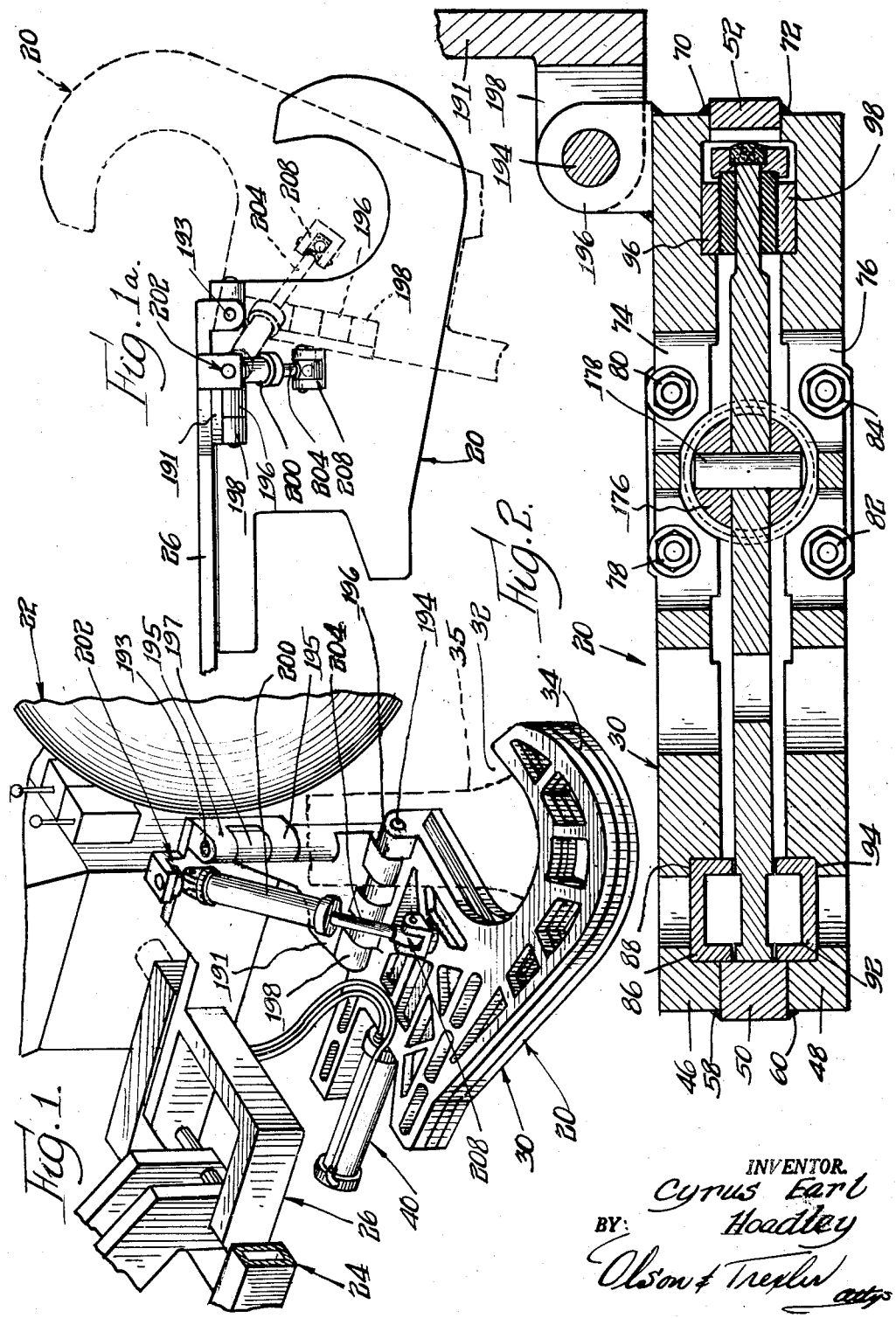
INVENTOR.
Cyrus Earl
BY: Hoadley
Olson & Trexler attys

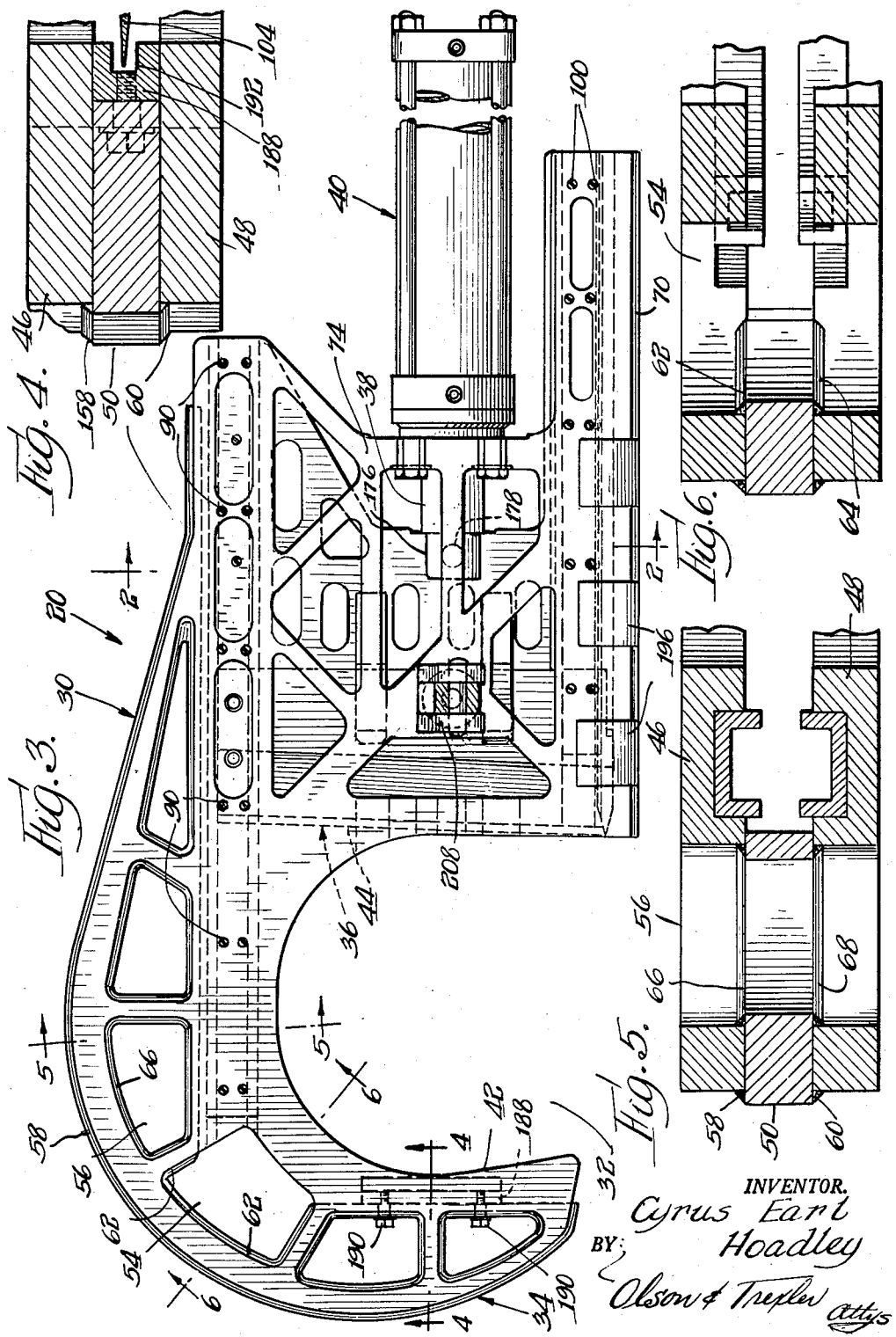

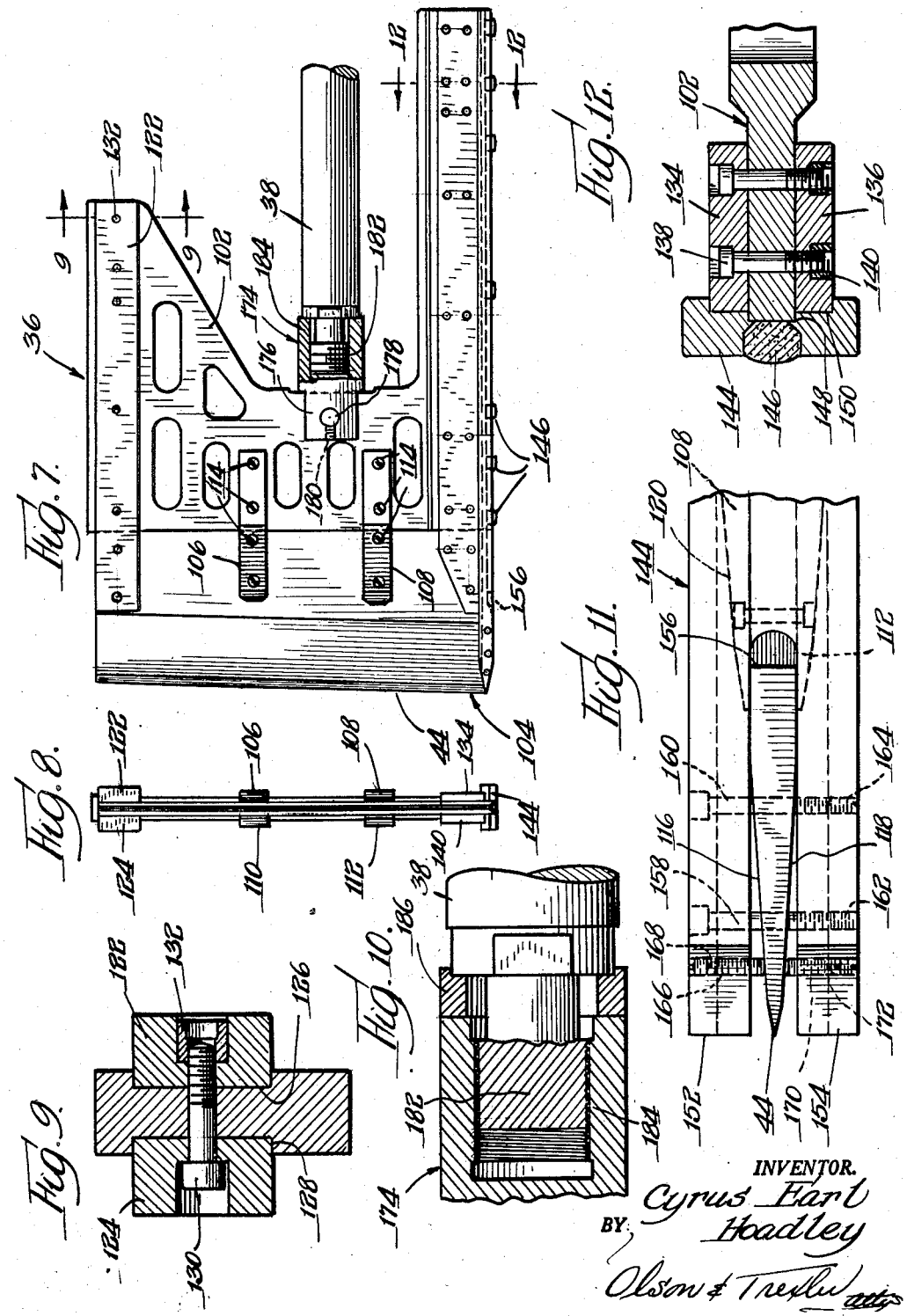

United States Patent Office 2,845,101
Patented July 29, 1958

2,845,101

TIMBER SHEARING HEAD

Cyrus Earl Hoadley, Kankakee, Ill., assignor to Manco Mfg. Co., Bradley, Ill., a corporation of Illinois Application August 31, 1955, Serial No. 531,768

9 Claims. (Cl. 144—34)

The present invention relates to a novel apparatus for harvesting trees and the like, and more particularly to a novel cutter head which may be used for felling standing trees and for bucking previously felled trees.

It has heretofore been suggested to provide apparatus which includes, among other things, a cutter head having a body member adapted to be hooked around a tree and a hydraulically actuated blade slidably mounted on the body member for severing the tree. It is broadly an object of the present invention to provide an improved cutter head of this type.

In certain instances such as when a tree has an irregular shape or is disposed at a difficult angle, the body of the cutter head may tend to shift relative to the tree during a severing operation. It is therefore a more specific object of the present invention to provide an improved cutter head wherein the body member and the shearing blade are formed so that the tree will be wedged therebetween in a manner which prevents shifting of the cutter head relative to the tree during a severing operation.

Another object of the present invention is to provide an improved cutter head wherein the body and the blade are constructed so as to improve the ruggedness and rigidity thereof without unduly increasing the weight thereof, whereby to reduce any flexing or deformation of the body and blade under the stresses of a severing operation and thereby prevent binding of the blade with respect to the body.

Another more specific object of the present invention is to provide an improved cutter head of the type described above wherein a sharpened portion of the blade structure may be removed for sharpening purposes or replaced if broken, and wherein the blade structure is formed so as to provide an improved wedging action for directing the fall of a tree being severed.

A further specific object of the present invention is to provide a novel cutter head wherein opposite side edges of the cutter or shearing blade are supported in a manner which substantially reduces any possibility of the blade becoming twisted and broken as the blade traverses an opening in the cutter head body member during a severing operation.

Another object of the present invention is to provide a timber harvesting apparatus wherein the cutter head is mounted on a vehicle or the like so that it may be turned relative to the vehicle for receiving trees standing at various angles and for directing the fall of trees at various angles relative to the vehicle whereby the need for maneuvering the vehicle relative to a given tree may be reduced.

Other objects and advantages of the present invention will become apparent from the following description and the accompanying drawings wherein:

Fig. 1 is a fragmentary perspective view showing a cutter head embodying the principles of this invention mounted on a tractor and positioned for felling a tree which is shown in broken lines;

Fig. 1a is a simplified plan view showing how the cutter head is mounted and showing in broken lines how the cutter head may be pivoted about a vertical axis after it has been lowered to a substantially horizontal position;

Fig. 2 is an enlarged cross sectional view taken along the line 2—2 in Fig. 3;

Fig. 3 is a plan view showing a novel cutter head of this invention;

Fig. 4 is a sectional view taken along line 4—4 in Fig. 3;

Fig. 5 is a sectional view taken along line 5—5 in Fig. 3;

Fig. 6 is a sectional view taken along line 6—6 in Fig. 3;

Fig. 7 is a plan view showing the novel cutter or shearing blade structure of this invention;

Fig. 8 is a front end view of the novel cutter or shearing blade structure;

Fig. 9 is a sectional view taken along line 9—9 in Fig. 7;

Fig. 10 is an enlarged fragmentary view partially in section showing the connection between the cutter blade structure and a hydraulically actuated ram;

Fig. 11 is a fragmentary elevational view of an edge of the novel cutter blade structure and shows in greater detail how one edge of the blade is supported or reinforced so as to prevent injury to the blade; and Fig. 12 is a sectional view taken along line 12—12 in Fig. 7.

Referring now more specifically to the drawings wherein like parts are designated by the same numerals throughout the various figures, a cutter head 20 embodying the principles of this invention is shown mounted on a tractor 22 in Fig. 1. The cutter head may be mounted on the tractor by means including a linkage mechanism generally designated by the numeral 24 and including a link 26, but since this linkage mechanism forms no part of the present invention it need not be described in detail. Furthermore, it should be understood that the cutter head may be mounted on the tractor at any desired position and by any suitable means, or the cutter head may be mounted on any other vehicle or suitable support structure. However, in accordance with a feature of this invention, the cutter head is mounted on the link 26 or other suitable support means for movement about vertical and horizontal axes by the means and for the reasons set forth below. Preferably, hydraulic means, not shown, is provided on the tractor, vehicle, or other support structure for supplying power to actuate the cutter head in the manner described below.

The cutter head 20 includes a body structure 30 having a lateral opening 32 therein for receiving a tree 34 as shown in Fig. 1 and a hook portion 34 for partially surrounding a tree 35. A blade structure 36 (Fig. 3) is slidably mounted in the body structure and is adapted to be advanced toward and retracted from the hook portion 34 by means of a ram 38 which is actuated by a hydraulic cylinder 40 secured to the body structure. During a severing operation, the tree trunk is tightly clamped between an inner margin 42 of the hook portion 34 and the sharpened leading edge 44 of the blade structure, as will be understood. It should be noted that the margin 42 and the cutting edge 44 are formed so that they converge with respect to each other from the closed side of the body structure toward the mouth of the opening 32. This arrangement provides the opening with a restricted mouth and also serves to cam or bias the tree toward the closed side of the body structure during a severing operation. Thus, any possibility of the body structure slipping laterally relative to the tree sufficiently to prevent proper severing of the tree is eliminated.

The body structure 30 is formed so that it has great strength and rigidity. As shown in Figs. 1 through 6, the body structure includes a pair of plate members 46 and 48. A spacing plate 50 is disposed between the hook portions and connecting side portions of the plate members, and an elongated spacing block 52 is disposed between the opposite side margins of the plate members. Preferably the plate members 46, 48 and 50 are provided with openings 54 and 56 and other similar openings in the manner shown, which openings serve to decrease the weight of the body structure without materially decreasing the strength and rigidity thereof. The spacing plate 50 is welded as at 58 and 60 to the peripheral edges of the plate members 46 and 48. The spacing plate is also welded to the plate members 46 and 48 partially around the periphery of the opening 54 as indicated at 62 and 64 in Figs. 3 and 6. The spacing plate is welded to the plate members entirely around the periphery of the opening 56 as indicated at 66 and 68 and is similarly welded to the plate members entirely around the peripheries of the other openings in the hook and side portions. It should be noted that the spacing plate is formed so that it projects slightly laterally outwardly of the plate member margins and also slightly within the plate member openings in the manner shown so as to facilitate welding thereof to the plate members. The spacing block 52 is also welded to the plate members 46 and 48 as indicated at 70 and 72. The central portions of the plate members 46 and 48 are also provided with a plurality of openings defined by bracing webs as shown best in Fig. 3 so as further to decrease the weight of the body structure without impairing the strength and rigidity thereof. As shown in Figs. 2 and 3, the hydraulic cylinder 40 is secured to transverse web portions 74 and 76 of the plate members 46 and 48 by stud and nut means 78, 80, 82 and 84.

The space between the plate members 46 and 48 and the spacing members 50 and 52 is adapted to receive the cutter blade structure, and means is provided for guiding the cutter blade structure so as to insure free straight line movement of the shearing blade relative to the body structure. This means includes an inverted channel shaped bearing or wear strip 86 seated within a longitudinally extending slot 88 formed in the plate member 46. The bearing strip 86 is preferably removably connected with the plate member by means of a plurality of screws 90. A similar channel shaped bearing strip 92 is disposed in an elongated slot 94 formed in the plate member 48 and is removably secured in position by means of a plurality of screws. At the opposite sides of the plate members 46 and 48 simple flat elongated wear or bearing strips 96 and 98 are respectively secured thereto for cooperation with wear strips on the blade structure. The strip 96 is secured to the plate member 46 by a plurality of screws 100 and the strip 98 is secured in position by means of similar screws. Since only the bearing strips 86 and 92 are channel shaped and serve to restrain the blade structure against lateral shifting with respect to the body structure, the blade structure may be easily assembled with the body without being perfectly aligned with the bearing strips 96 and 98. Furthermore, free movement of the blade structure relative to the body is assured since even if the body should flex slightly under the strain of a severing operation so that the channel shaped bearing strips are displaced slightly relative to the flat bearing strips, the blade structure may shift slightly laterally relative to the flat guide strips whereby binding of the blade structure is avoided.

The cutter blade structure 36 which is shown best in Figs. 2 and 7 through 12 comprises a plate like carrier member 102 having a plurality of openings therein formed in the manner shown for decreasing the weight thereof. A blade member 104 having the above mentioned sharpened edge 44 is detachably connected to the carrier member so that it may be removed for resharpening or replacement whenever desired. The blade member is connected to the carrier member by means including a plurality of elongated blocks 106, 108, 110 and 112, and a plurality of screws 114. It should be noted that behind the sharpened edge portion 44 the blade member 104 is provided with diverging wedge surfaces 116 and 118 which tend to tip a tree being severed in the direction of movement of the blade structure and therefore tend to control the direction of fall of the tree. It is also important to note that the connecting blocks 106 through 112 have, as shown best in Fig. 11, relative sharp forward ends to facilitate entry thereof into a kerf formed by the blade member and wedging surfaces 120 which further control the direction of fall of the tree. The inclined or diagonal arrangement of the sharpened cutting edge 44 with respect to the direction of movement of the cutter blade structure not only serves to retain a tree being severed in the manner described above, but also promotes more efficient and cleaner shearing of the tree.

The cutter blade structure is provided with elongated wear plates 122 and 124 respectively seated in elongated slots 126 and 128 formed in opposite sides of the carrier and blade members. These wear plates are secured in position by a plurality of screws 130 and cooperating nut members 132. The wear plates 122 and 124 are adapted to extend within and cooperate with the channel shaped guide strips 86 and 92 respectively as shown best in Fig. 2. It should be noted that the nut members 132 and the heads of the screw members 130 are recessed within suitable counterbores formed in the wear strips 122 and 124 so as to avoid interference with the channel shaped guide strips. It will be appreciated that since the channel shaped guide strips and the wear strips 122 and 124 are seated in elongated slots in their respective associated members in the manner shown, any transverse shear stresses are absorbed directly by their respective associated members rather than transmitted through the securing screw members so that the blade structure is rigidly guided for straight line movement. Additional elongated wear strips 134 and 136 are removably secured to opposite sides of the carrier and blade members 102 and 104 for cooperation with the elongated wear plates 96 and 98 respectively. A plurality of screw members 138 having countersunk head portions and countersunk nut members 140 are provided for securing the wear strips 134 and 136 in position. The forward ends of the wear strips 134 and 136 are diagonally formed as shown in Fig. 7 so as to avoid undue interference with a tree during a shearing or severing operation.

As shown in Fig. 3, the channel shaped guide members 86 and 90 extend substantially to the hook portion of the body structure so that one side of the blade structure is supported while the blade structure is advanced across the opening 32 during a severing operation. However, the side of the blade structure transversing the mouth of the opening 32 has only a rear portion thereof supported by the body structure. In order to provide additional support for this side of the blade structure, the carrier member and the wear plates 134 and 136 extend rearwardly sufficiently so that substantial portions thereof are always disposed between and supported by the wear plates 96 and 98. Furthermore, means is provided for reinforcing or supporting the free side edge of the blade member 104. This means includes an elongated member 144 which is secured to the edge of the carrier member 102 at a plurality of spaced points by welds 146. As shown in Figs. 2 and 12, the member 144 is provided with an elongated slot 148 which receives the marginal edge of the carrier member 102 and the blade member 104, and elongated slot means 150 which receives marginal edges of the wear plates 134 and 136 so as to rigidify the edge of the blade structure. The forward end of the member 144 is bifurcated as shown in Fig. 11, and arm portions 152 and 154 thereof respectively overlie and underlie an extension 156 of the blade member. A pair of screw members 158 and 160 extend through aligned apertures in the arm 152 and the blade extension 156 and are threaded into tapped apertures 162 and 164 in the arm 154. In addition, the blade is supported adjacent its forward end by a set screw 166 threaded into an aperture 168 in the arm 152 and by a set screw 170 threaded into an aperture 172 in the arm 154. The forward ends of the arms 152 and 154 are pointed as shown in Figs. 7 and 8 so as to avoid undue interference with a tree or the like being severed.

As shown in Figs. 2, 7 and 10, an adapter member 174 is provided for connecting the ram 38 to the carrier member of the blade structure. The adapter member has a bifurcated portion 176 which is slipped over the carrier member and pivotally connected thereto by means of a pin 178 so as to allow for a slight misalignment between the ram and the blade structure. The pin is secured in position by a set screw 180. The ram is provided with a threaded tip 182 which is connected with an internally threaded socket portion 184 of the adapter member. It will be appreciated that as the blade member 104 is sharpened it will be shortened. In order to compensate for such shortening and to insure that the blade member will completely traverse the opening 32, the carrier structure may be adjusted relative to the ram by partially unthreading the tip 182 from the socket as shown in Fig. 10 and inserting a bushing 186 between the adapter member and the ram. The length of the internally threaded socket portion is sufficient to permit bushings of various widths to be used without disengaging the tip 182 from the socket.

In order to insure complete severing of the last fibers to be sheared, an anvil block 188 is secured to the hook portion of tthe spacing plate 50 by means of a plurality of screws 190. This block, which is shown in Figs. 3 and 4, is provided with a slot 192 adapted to receive the sharpened edge of the blade member so that any of the tree fibers pressed against the face of the block by the blade member during a severing operation will be sheared.

In accordance with a feature of this invention, the cutter head is mounted on the link 26 so that it may be pivoted about both a horizontal axis and a vertical axis. This arrangement enables the cutter head to be applied to trees standing at various angles and also enables the cutter head to be positioned so as to direct the fall of the tree at various angles relative to the tractor. This feature is particularly of importance when the apparatus is being used in a forest wherein the space available for maneuvering the tractor is limited and the tree must be severed so that it will fall into a particular cleared area. For example, in certain instances, the tractor may be positioned so that it is desirable to direct the fall of the tree substantially perpendicularly from the tractor; while in other instances, it may be desirable to sever the tree so that it will fall at say an angle of about 60° with respect to the tractor. Another advantage of felling the tree at an acute angle to or as nearly parallel to the tractor as safety will permit is that minimum subsequent maneuvering of the tractor is required to arrange the tractor generally parallel to the fallen tree to permit bucking or sectionalizing thereof.

The cutter head is connected to the link 26 for movement in the above described manner by means including a link 191 pivoted to the link 26 by a vertical shaft or pin 193 (Fig. 1a) which extends through lugs 195 and 197 respectively welded to the links 26 and 191. The cutter head is hinged to the lower margin of the link 191 by a shaft 194 which extends through lugs 196 and 198 respectively welded to the head and the link 191. In addition, a hydraulic cylinder 200 is connected to the upper margin of the link 26 for pivotal movement about horizontal and vertical axes by means 202, and a ram 204 extending from the cylinder is connected to the plate member 46 for pivotal movement about vertical and horizontal axes by means 208. The head is swung toward an upright position when hydraulic fluid under pressure is supplied to the cylinder 202 so as to retract the ram, and the head may be lowered by releasing the hydraulic fluid under pressure and allowing the head to fall under its own weight to the horizontal position shown in Fig. 1. Then by applying hydraulic pressure to the upper end of the ram, the cutter head is caused to pivot about the vertical pin 193 as shown in Fig. 1a.

As mentioned above, the cutting head of the present invention may be used not only for felling standing trees but also for bucking or sectionalizing fallen trees. This may be accomplished by turning the head from the generally horizontal position shown in Fig. 1 to an upright position so that the hook portion may be passed around a tree lying on the ground. When the cutting head is used in this manner, the above described reinforcing member 144 at the free side of the blade structure serves to reduce any possibility of the blade being injured as a result of striking rocks or other foreign objects on the ground.

While the preferred embodiment of the present invention has been shown and described herein, it is obvious that many structural details may be changed without departing from the spirit and scope of the appended claims.

The invention is claimed as follows:

1. A cutter head for severing trees and the like comprising body means having a lateral opening for receiving a tree or the like to be severed, said body means including a hook portion partially defining said opening and adapted to be passed around said tree, and shearing blade means slidably carried by said body means for movement across said opening toward and away from said hook portion, a pair of spaced parallel guide means on said body means and respectively guiding opposite margins of said blade means, said blade means comprising a carrier member fully traversing the space between said guide means and adapted to be connected to means for actuating the blade means, a sharpened separate blade member extending forwardly of said carrier member and substantially traversing the space between said pair of guide means, wedge means connected with said carrier member and overlying said blade member and disposed for entering a kerf in a tree being severed and controlling the direction of fall of a standing tree being severed, and detachable fastening means extending through said wedge means and said blade member and detachably securing said blade member with respect to said carrier member, said fastening means being substantially confined within said wedge means and said blade member for avoiding interference with a tree being severed.

2. A cutter head as defined in claim 1, wherein said wedge means includes a plurality of wedge blocks disposed at opposite sides of said carrier and blade members and having inclined surfaces facing generally in the direction of movement of said blade means, opposite ends of said fastening means being substantially confined within wedge blocks at opposite sides of the blade member.

3. A cutter head for severing trees and the like comprising body means having a lateral opening for receiving a tree or the like to be severed, said body means including a hook portion defining a portion of said opening and adapted to be passed around said tree, shearing blade means slidably carried by said body means for movement across said opening and toward and away from said hook portion, guide means on said body means for one side margin of said blade means, which guide means is disposed along a closed side marginal portion of said body means and substantially traverses said opening, and an elongated supporting member secured to an opposite side margin of said blade means and including a bifurcated forward end portion having sections respectively overlying opposite surfaces of said blade means and extending substantially to a forward edge of said blade means, and adjustable abutment means extending from said sections and clamping said blade means therebetween for restraining flexing of the blade means during a shearing operation.

4. A cutter head for severing trees and the like comprising body means having a lateral opening in one side edge thereof for receiving a tree or the like to be severed and an opposite closed side edge, said body means including a hook portion partially defining said opening and adapted to be passed around said tree, a carrier member slidably carried by said body means for reciprocable movement toward and away from said hook portion and adapted to be connected to actuating means, a shearing and wedging blade member detachably associated with said carrier member, means including wedge means detachably connecting said blade member with said carrier member which wedge means is disposed for entering a kerf in a standing tree being severed and controlling the direction of fall of the tree, guide means for said blade member extending along said closed side of the body means and substantially traversing said opening, an elongated member secured to a marginal portion of said carrier member oppositely from said guide means and having sections extending along opposite surfaces of said blade member, and adjustable abutment means extending from said sections and clamping therebetween a forward portion of said blade member for supporting said portion of the blade member as the blade member moves across said opening.

5. A cutter head for severing trees and the like comprising body means having a lateral opening for receiving a tree to be severed, and a hook portion defining a portion of said opening and adapted to be passed around said tree, and shearing blade means slidably carried by said body means for movement across said opening toward and away from said hook portion, said body means including a pair of spaced plate members, spacing members disposed between opposite marginal portions of said plate members and welded thereto, said shearing blade means being disposed between said plate members and between said spacing members, a pair of opposed generally channel shaped guide members respectively seated within slots in, and secured to, opposing faces of said plate members, said channel shaped guide members receiving and cooperating with means rigidly carried by said blade means for guiding the blade means for straight line movement and for retaining the blade means against lateral shifting relative to the body means, and a pair of substantially flat bearing members respectively secured to said plate members in opposing relationship and cooperable with complementary bearing members carried by said blade means.

6. A cutter head, as defined in claim 1, which includes a pair of bearing means extending along opposite margins of said carrier and blade members and respectively cooperable with said pair of guide means, means securing said bearing means to said carrier member, and means detachably connecting said bearing means to said cutting member.

7. A cutter head for severing trees and the like comprising body means having a lateral opening for receiving a tree or the like to be severed, said body means including a hook portion partially defining said opening and adapted to be passed around said tree, shearing blade means slidably carried by said body means for movement across said opening toward and away from said hook portion, a pair of spaced parallel guide means on said body means and respectively guiding opposite margins of said blade means, said blade means comprising a carrier member fully traversing the space between said pair of guide means and adapted to be connected to means for actuating the blade means, a sharpened separate blade member extending forwardly of said carrier member and substantially traversing the space between said pair of guide means and detachably connected with said carrier member, a pair of bearing means extending along opposite margins of said carrier and blade members and respectively cooperable with said pair of guide means, means securing said bearing means to said carrier member, and means detachably connecting said bearing means with said blade member.

8. An apparatus for severing trees and the like, and comprising a mobile support means, a cutter head including a hook portion defining with an adjacent portion of the cutter head a lateral opening, said hook portion adapted to be passed around a tree and also including a reciprocable shearing blade mounted thereon, means for reciprocating the said blade toward and away from the hook portion for severing a tree received in said lateral opening, a vertically disposed support member mounted on said mobile support means for movement relative thereto about a substantially vertical axis, means mounting said cutter head on said vertical support member for swinging movement relative thereto about a substantially horizontal axis between an elevated and a substantially horizontal position, and means for controlling movements of said cutter head about the said vertical and horizontal axes and including a single actuating mechanism which comprises a double acting fluid cylinder and piston having one end pivotally connected to said mobile support means and the other end pivotally connected to said cutter head and operating to position the cutter head about the said horizontal axis and then to shift the horizontally positioned cutter head about said vertical axis.

9. A cutter head for severing trees and the like comprising body means having a lateral opening for receiving a tree or the like to be severed, said body means including a hook portion partially defining said opening and adapted to be passed around said tree, shearing blade means slidably carried by said body means for movement across said opening toward and away from said hook portion, a pair of spaced parallel guide means on said body means and respectively guiding opposite margins of said blade means, said blade means comprising a carrier member fully traversing the space between said pair of guide means and adapted to be connected to means for actuating the blade means, a sharpened separate blade member extending forwardly of said carrier member and substantially traversing the space between said pair of guide means and detachably connected with said carrier member, a pair of bearing means extending along opposite margins of said carrier and blade members and respectively cooperable with said pair of guide means, and means securing said bearing means to said carrier member, and at least one of said bearing means extending substantially to the leading edge portion of the adjacent margin of the blade member and removably supporting said leading edge portion.

References Cited in the file of this patent

UNITED STATES PATENTS

| 2,195,045 | Bernay | Mar. 26, 1940 |
| 2,385,419 | Matulich | Sept. 25, 1945 |
| 2,411,623 | Jaques | Nov. 26, 1946 |
| 2,543,109 | Holowka | Feb. 27, 1951 |
| 2,751,943 | Ford | June 26, 1956 |

FOREIGN PATENTS

| 122,748 | Australia | Nov. 7, 1946 |